US009276716B2

(12) United States Patent
Wetterwald et al.

(10) Patent No.: US 9,276,716 B2
(45) Date of Patent: Mar. 1, 2016

(54) SENSOR DATA TRANSPORT AND CONSOLIDATION WITHIN COMMUNICATION NODES IN A NETWORK

(71) Applicants: Patrick Wetterwald, Mouans Sartoux (FR); Jean-Philippe Vasseur, Saint Martin d'Uriage (FR); Pascal Thubert, La Colle Sur Loup (FR)

(72) Inventors: Patrick Wetterwald, Mouans Sartoux (FR); Jean-Philippe Vasseur, Saint Martin d'Uriage (FR); Pascal Thubert, La Colle Sur Loup (FR)

(73) Assignee: Cisco Technology, Inc., San Jose, CO (US)

(*) Notice: Subject to any disclaimer, the term of this patent is extended or adjusted under 35 U.S.C. 154(b) by 85 days.

(21) Appl. No.: 14/021,744

(22) Filed: Sep. 9, 2013

(65) Prior Publication Data
US 2015/0071255 A1    Mar. 12, 2015

(51) Int. Cl.
*H04L 12/50*    (2006.01)
*H04L 5/00*    (2006.01)
*H04L 12/46*    (2006.01)
(Continued)

(52) U.S. Cl.
CPC .............. *H04L 5/0037* (2013.01); *H04L 12/46* (2013.01); *H04L 12/56* (2013.01); *H04W 4/006* (2013.01)

(58) Field of Classification Search
CPC ....... H04L 9/0836; H04L 45/48; H04L 12/46; H04L 12/56; H04L 12/28; H04L 12/25
USPC .................................. 370/367, 238, 255, 256
See application file for complete search history.

(56) References Cited

U.S. PATENT DOCUMENTS 7,113,536 B2 *  9/2006  Alriksson ............... H04B 1/713
                                                          370/230
7,324,453 B2 *  1/2008  Wu et al. ........................ 370/238
(Continued)

FOREIGN PATENT DOCUMENTS

EP         2 398 196 A1    12/2011
WO     2013/071949 A1     5/2013
WO     2014/058936 A1     4/2014

OTHER PUBLICATIONS

PCT International Invitation to Pay Additional Fees and Partial International Search Report, PCT Application PCT/US2014/050910, ISA/EP, European Patent Office, Netherlands, mailed Nov. 19, 2014 (six pages).

(Continued)

*Primary Examiner* — Ricky Ngo
*Assistant Examiner* — Dewanda Samuel
(74) *Attorney, Agent, or Firm* — The Law Office of Kirk D. Williams

(57) ABSTRACT

In one embodiment, sensor data is transported in a network to a rendezvous point network node, which consolidates the information into a consolidated result which is communicated to the destination. Such consolidation by a network node reduces the number of paths required in the network between the sensors and the destination. One embodiment includes acquiring, by each of a plurality of originating nodes in a wireless deterministic network, external data related to a same physical event; communicating through the network said external data from each of the plurality of originating nodes to a rendezvous point network node (RP) within the network; processing, by the RP, said external data from each of the plurality of originating nodes to produce a consolidated result; and communicating the consolidated result to a destination node of the network. In one embodiment, the network is a low power lossy network (LLN).

17 Claims, 10 Drawing Sheets

(51) Int. Cl.
*H04L 12/54* (2013.01)
*H04W 4/00* (2009.01)

(56) References Cited

U.S. PATENT DOCUMENTS

| | | | | |
|---|---|---|---|---|
| 7,701,940 | B2* | 4/2010 | Novello | H04L 47/11 370/229 |
| 7,710,940 | B2* | 5/2010 | Van Der Wal et al. | 370/350 |
| 8,363,662 | B2 | 1/2013 | Thubert et al. | |
| 8,447,849 | B2 | 5/2013 | Shaffer et al. | |
| 8,451,744 | B2 | 5/2013 | Vasseur | |
| 8,489,765 | B2 | 7/2013 | Vasseur et al. | |
| 8,599,822 | B2* | 12/2013 | Castagnoli | 370/350 |
| 8,630,177 | B2 | 1/2014 | Vasseur et al. | |
| 8,817,665 | B2 | 8/2014 | Thubert et al. | |
| 2005/0138200 | A1* | 6/2005 | Liu et al. | 709/238 |
| 2005/0265255 | A1* | 12/2005 | Kodialam et al. | 370/252 |
| 2006/0087992 | A1 | 4/2006 | Ganesh | |
| 2008/0222478 | A1 | 9/2008 | Tamaki | |
| 2009/0105567 | A1 | 4/2009 | Smith et al. | |
| 2011/0205902 | A1* | 8/2011 | Zi et al. | 370/238 |
| 2012/0117268 | A1* | 5/2012 | Shaffer et al. | 709/238 |
| 2012/0155329 | A1 | 6/2012 | Shaffer et al. | |
| 2012/0197911 | A1 | 8/2012 | Banka et al. | |
| 2012/0254338 | A1* | 10/2012 | Agarwal et al. | 709/208 |
| 2012/0300668 | A1 | 11/2012 | Thubert et al. | |
| 2013/0058349 | A1* | 3/2013 | Khalil et al. | 370/400 |
| 2014/0006893 | A1 | 1/2014 | Shetty et al. | |
| 2014/0225896 | A1* | 8/2014 | Zhang | H04L 45/22 345/440 |
| 2014/0233422 | A1 | 8/2014 | Thubert et al. | |

OTHER PUBLICATIONS

Awduche et al., "RSVP-TE: Extensions to RSVP for LSP Tunnels," RFC 3209, Dec. 2001, The Internet Society, Reston, VA (sixty-one pages).
Winter et al., "RPL: IPv6 Routing Protocol for Low-Power and Lossy Networks," RFC 6550, Mar. 2012, The Internet Society, Reston, VA, USA (157 pages).
Goyal et al., "Reactive Discovery of Point-to-Point Routes in Low-Power and Lossy Networks," RFC 6997, Aug. 2013, The Internet Society, Reston, VA, USA (forty pages).
Thubert et al, "Available Routing Constructs," draft-thubert-rtgwg-arc-00, Oct. 2, 2012, The Internet Society, Reston, VA, USA (nineteen pages).
Thubert et al, "Applying Available Routing Constructs to bicasting," draft-thubert-rtgwg-arc-bicast-00, Oct. 11, 2012, The Internet Society, Reston, VA, USA (ten pages).
"Media Access Control (MAC) Bridges and Virtual Bridge Local Area Networks," IEEE Std 802.1Q™-2011, Aug. 31, 2011, IEEE Computer Society, IEEE, New York, NY (one thousand three hundred sixty-five pages).
Braden et al., "Resource ReSerVation Protocol (RSVP)—Version 1 Functional Specification," RFC 2205, Sep. 1997, The Internet Society, Reston, VA, USA (112 pages).
Le Faucheur, Resource Reservation Protocol (RSVP) Extensions for Path-Triggered RSVP Receiver Proxy, RFC 5946, Oct. 2010, The Internet Society, Reston, VA, USA (thirty-five pages).
"Part 15.4: Low-Rate Wireless Personal Area Networks (LR-WPANs) Amendment 1: MAC sublayer," IEEE Std 802.15.4e™-2012, Apr. 16, 2012, IEEE Computer Society, IEEE, New York, NY (two hundred twenty-five pages).
Vasseur et al., "Path Computation Element (PCE) Communication Protocol (PCEP)," RFC 5440, Mar. 2009, The Internet Society, Reston, VA, USA (eighty-seven pages).
Wang et al., "6tus Layer Specification," draft-wang-6tsch-6tus-01, May 23, 2013, The Internet Society, Reston, VA, USA (fifty-six pages).
Yasukawa et al., "Operations and Management (OAM) Requirements for Point-to-Multipoint MPLS Networks," RFC 4687, Sep. 2006, The Internet Society, Reston, VA, USA (fourteen pages).
Bocci et al., "A Framework for MPLS in Transport Networks," RFC 5921, Jul. 2010, The Internet Society, Reston, VA, USA (fifty-six pages).
Atlas et al., "An Architecture for IP/LDP Fast-Reroute Using Maximally Redundant Trees," draft-ietf-rtgwg-mrt-frr-architecture-03, Jul. 12, 2013, The Internet Society, Reston, VA, USA (twenty-nine pages).
Ripphausen-Lipa et al., "The Vertex-Disjoint Menger Problem in Planar Graphs," SODA '93 Proceedings of the Fourth Annual ACM-SIAM Symposium on Discrete Algorithms, Society for Industrial and Applied Mathematics, Philadelphia, PA, 1993 (eight pages).
Thubert et al., "IETF 6TSCH: Combining IPv6 Connectivity with Industrial Performance," 2013 Seventh International Conference on Innovative Mobile and Internet Services in Ubiquitous Computing (IMIS), IEEE, New York, NY, Jul. 2013 (six pages).
"Deterministic Ethernet, IEEE 802.1 standards for real-time process control, industrial automation, and vehicular networks," available at http://www.ieee802.org/802_tutorials/2012-11/8021-tutorial-final-v4.pdf, Nov. 12, 2012, IEEE, New York, NY (seventy-two pages).
Watteyne et al., "Using IEEE802.15.4e TSCH in an LLN context: Overview, Problem Statement and Goals," draft-watteyne-6tsch-tsch-lln-context-02, May 23, 2013, The Internet Society, Reston, VA (twenty-three pages).
Farrel et al., "A Path Computation Element (PCE)-Based Architecture," RFC 4655, The Internet Society, Reston, VA (forty pages).
PCT International International Search Report and Written Opinion, PCT Application PCT/US2014/050910, ISA/EP, European Patent Office, Netherlands, mailed Feb. 5, 2015 (sixteen pages).

\* cited by examiner

SENSOR DATA TRANSPORT AND CONSOLIDATION WITHIN COMMUNICATION NODES IN A NETWORK

TECHNICAL FIELD

The present disclosure relates generally to forwarding packets in a communications network, including, but not limited to, a wireless deterministic network.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Deterministic networks rely on a set of predetermined time slots, which define at least a time (and possibly frequency to use especially in a wireless deterministic network), when each specific node can communicate a packet to a second specific node in the deterministic network.

BRIEF DESCRIPTION. OF THE DRAWINGS

The appended claims set forth the features of one or more embodiments with particularity. The embodiment(s), together with its advantages, may be best understood from the following detailed description taken in conjunction with the accompanying drawings of which:

DESCRIPTION OF EXAMPLE EMBODIMENTS

Overview

Figure 1A:
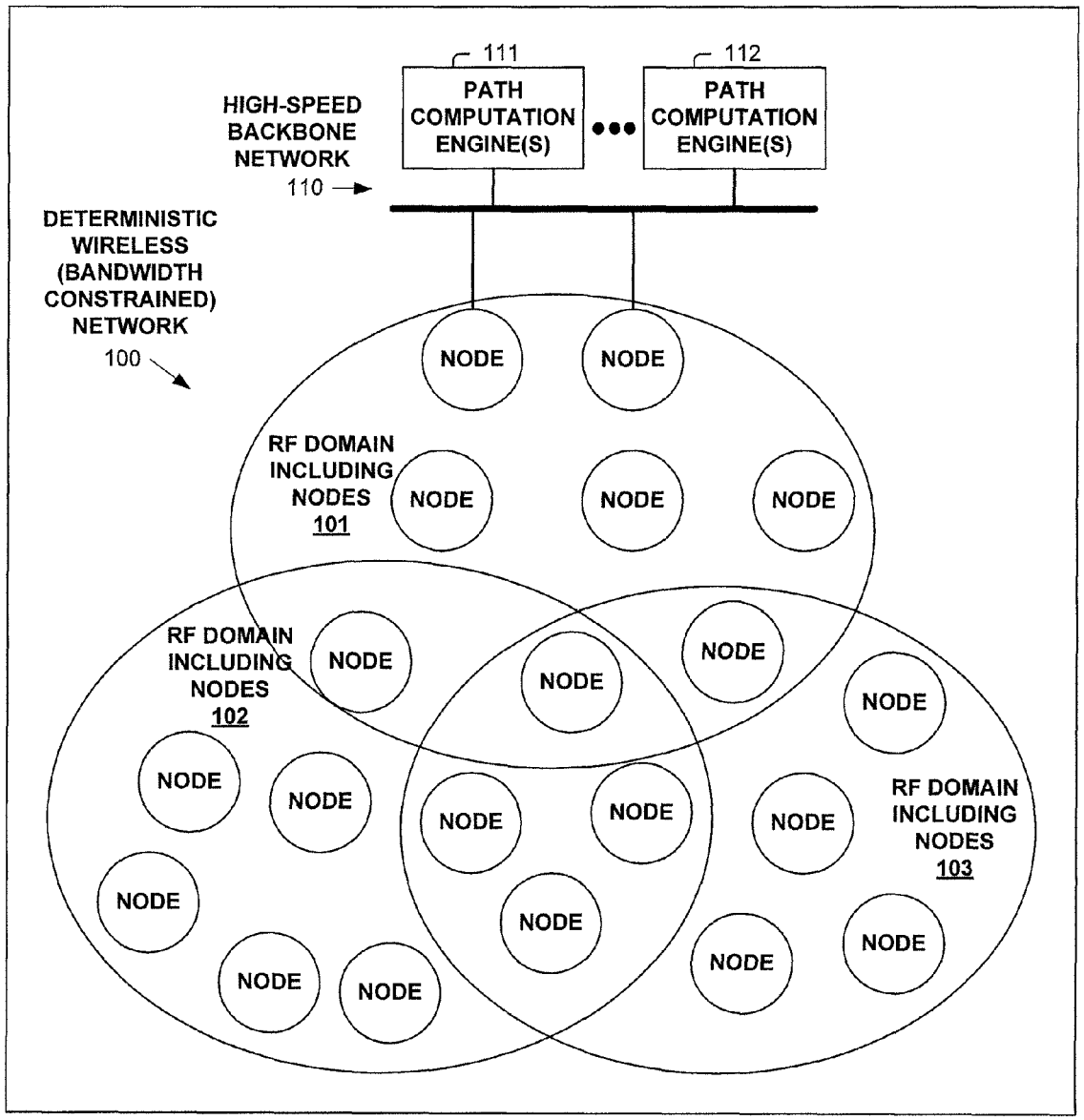
FIG. 1A illustrates a network operating according to one embodiment.

Disclosed are, inter alia, methods, apparatus, computer-storage media, mechanisms, and means associated with sensor data transport and consolidation within communication nodes in a network, especially a wireless deterministic network.

One embodiment includes acquiring, by each of a plurality of originating nodes in a wireless deterministic network, external data related to a same physical event; communicating through the network said external data from each of the plurality of originating nodes to a rendezvous point network node (RP) within the network; processing, by the RP, said external data from each of the plurality of originating nodes to produce a consolidated result; and communicating the consolidated result to a destination node of the network. In one embodiment, the network is a low power lossy network (LLN).

One embodiment includes: receiving, by a rendezvous point network node (RP) in a wireless deterministic network, a plurality of packets including external data acquired by a plurality of different originating nodes in the network, with said external data including an instrumented result of a same physical event; processing, by the RP, said received external data from each of the plurality of different originating nodes to generate a consolidated result; and sending the consolidated result to a destination in the network.

One embodiment includes: receiving, by a path computation engine, a notification from each of a plurality of originating nodes in a wireless deterministic network that they will be generating external data related to a same physical event; and determining, by the path computation engine, paths and time slots for communicating said external data from the plurality of originating nodes in a wireless deterministic network to a rendezvous point network node (RP), and from the RP to a destination node in the network.

Description

Disclosed are, inter alia, methods, apparatus, computer-storage media, mechanisms, and means associated with sensor data transport and consolidation within communication nodes in a network. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments. The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

As used herein, a "time slot" refers an elementary communications entity including a period of time for sending or receiving information (e.g., a packet). In the context of a wireless network, a time slot is also typically associated with a frequency, as the information is not only transmitted within a time slot, but also at a frequency (e.g., channel).

Expressly, turning to the figures, FIG. 1 illustrates a network 100 (e.g., deterministic wireless network, which is bandwidth constrained) operating according to one embodiment. As shown, network 100 includes a high-speed (e.g., Ethernet) backbone network including one or more path computation engines 111-112. Deterministic wireless network 100 includes three overlapping different radio frequency (RF) domains 101, 102 and 103, each containing a plurality of nodes as shown in FIG. 1A. Note, typically and not shown, each of these network nodes (e.g., when a node operates as a bridge or router) is connected to a network of devices and/or directly connected to one or more devices. One embodiment uses more or less RF domains and/or nodes.

Figure 1B:
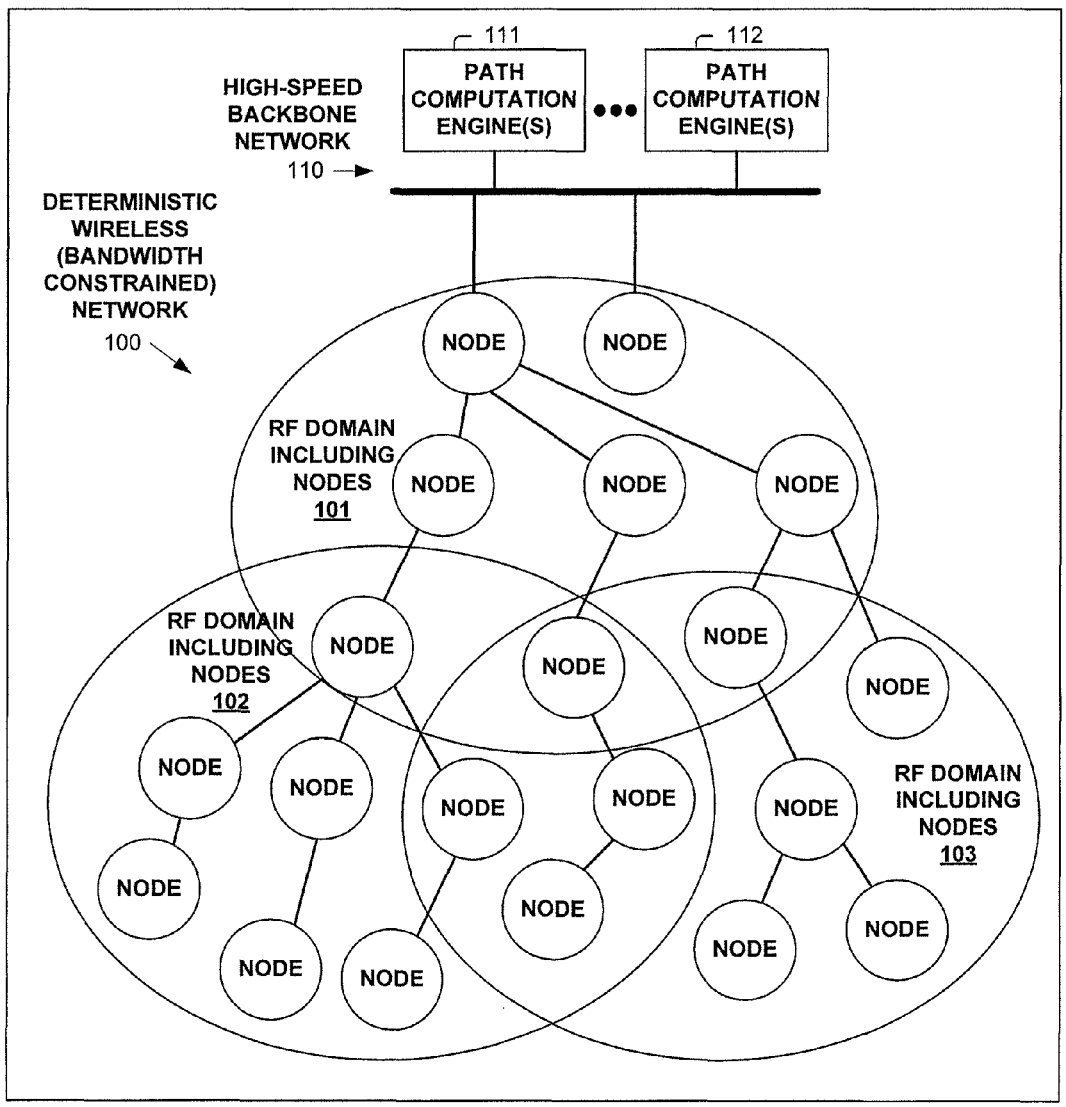
FIG. 1B illustrates a network operating according to one embodiment.

FIG. 1B illustrates the communication links established between nodes in RF domains 101, 102 and 103 to provide access to one or more path computation engines 111-112. In one embodiment, a communications path for transmitting packets between first and second nodes may traverse any set of nodes, and is not limited to one or more of the paths shown in FIG. 1B.

Figure 1C:
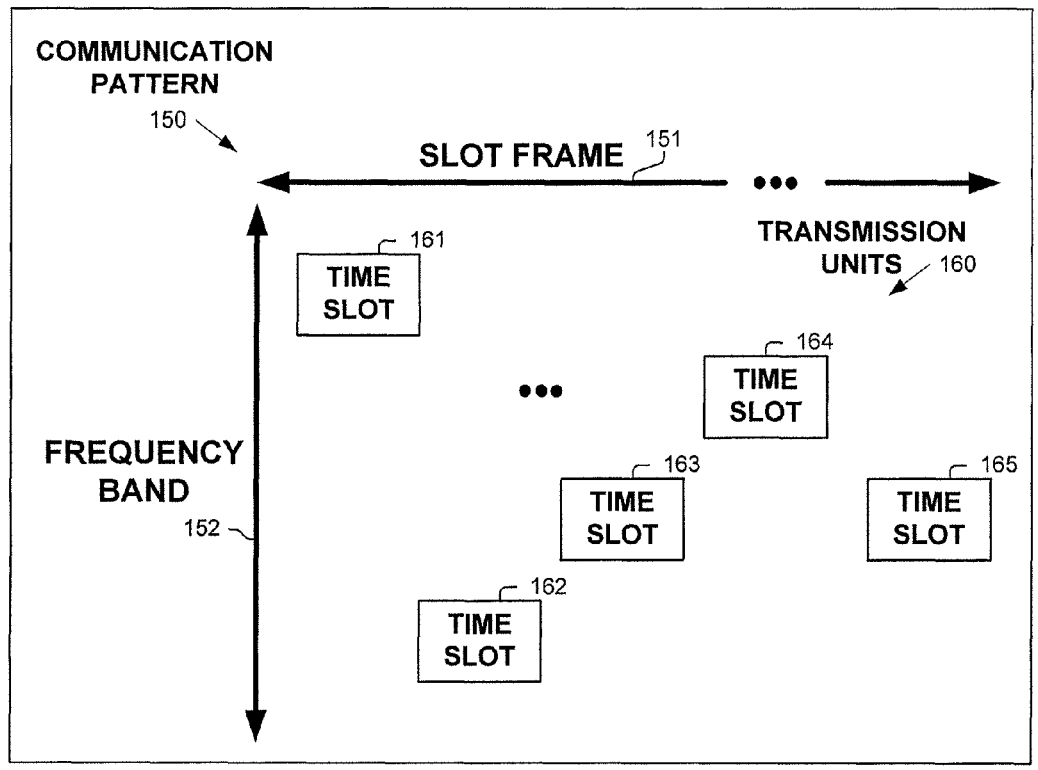
FIG. 1C illustrates a communication pattern operating according to one embodiment.

FIG. 1C illustrates a communication pattern 150 according to one embodiment of a deterministic network. Communication pattern 150 includes time slots 161-165, each of which provide a predetermined time for a sender to transmit a packet and for a receive to listen to receive the transmitted packet. A slot frame 151 (e.g., a Superframe when repeated typically with channel rotation) is a period of time divided into multiple time slots. Also, in a wireless (or fiber) a second dimension of frequency (152) is associated with each time slot 161-165. In one embodiment, a Superframe 151 is established by one or more path computation engines that defines a matrix of n time slots by m frequencies (e.g., channels). One or more of these n-m pairings is referred to herein as a time slot as multiple time slots might be used to send a packet (e.g., to have a predetermined retransmission time for the packet if required).

Figure 2:
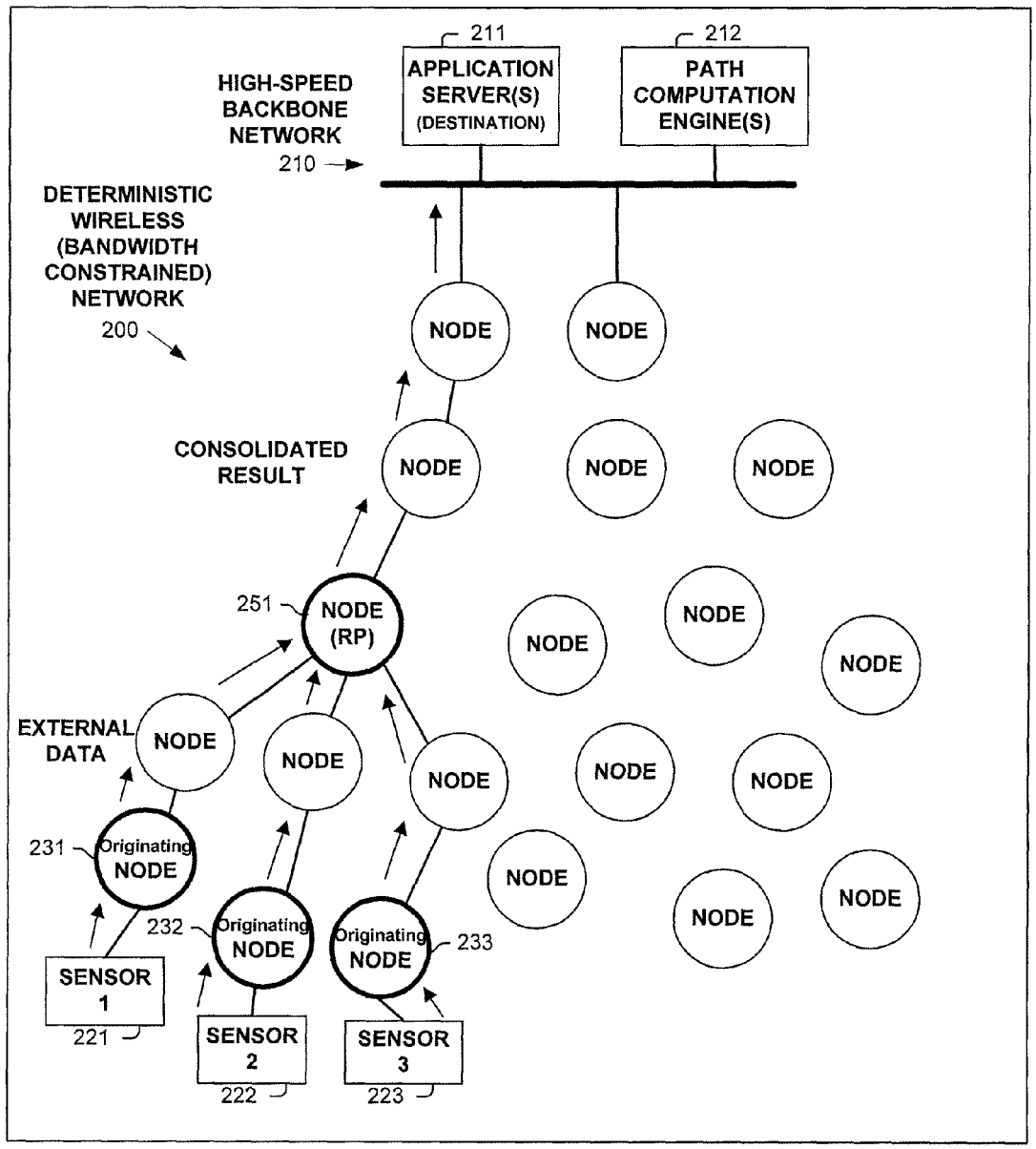
FIG. 2 illustrates a network operating according to one embodiment.

With reference to FIG. 2, in a time-slotted wireless deterministic network 200, one or more path computation engines (PCEs) 212 is used to compute the path (e.g., physical path and time slots) between each source S (sensor) 221-223 and the RP 251, and a single path from RP 251 to the destination (application host 211). PCE 212 computes the time slots and frequency channels used by each network hop, or some analogous abstraction that can be used by a more specific device to derive those.

By advertisement, configuration or by other means (e.g., from a network management system), PCE 212 discovers all sources 221-223 that will be deriving and sending external data related to a same physical event. Note, the term "external data" is used to denote data that is not related to a communication node, but to an external event.

PCE 212 also discovers one or more rendezvous points (RPs) 251 in network 200 that can be used to consolidate the multiple external data into a single consolidated result. PCE 212 discovers these rendezvous point(s) 251 by their advertisement, configuration or by other means (e.g., from a network management system).

In one embodiment, extensions to Dynamic Host Configuration Protocol (DHCP) or Constrained Application Protocol (CoAP), or another protocol are used by network nodes to report to the PCE their nature (e.g., type of sensed data and location) and whether they could add an aggregator for the type of sensed data.

Without consolidation by an RP in the network, there would need to be n independent paths determined and configured in the network to report the external data of n sensors 221-223 to the destination 211. Using RP 251 to consolidate this n external data into a single consolidated result greatly reduces the communication overhead of the network. In one embodiment, as shown in FIG. 2, there are n paths to RP 251 from sensors 221-223 (one path for each sensor), and one path from RP 251 to destination 211. One embodiment includes multiple RPs, such as for consolidating external data to an intermediate result, which a second (or more) RP consolidates with other external data or consolidated result(s).

In one embodiment, the PCE locates the nearest RP and computes for all the n sensors, their paths to the RP. In making the selection of the RP, one embodiment evaluates the following characteristics: set of sensing nodes along with the type of sensed data; data flow requirements (e.g., source, destination, bandwidth, delay); network topology and available resources; and the set of nodes in the network that can act as an RP the type of sensed data.

In one embodiment, the PCE computes its time slot schedule table in order for each data information coming from these n sensors to arrive to the rendezvous point in adjacent time slots. The PCE also computes the path and time slot schedule from the rendezvous point to the destination.

In one embodiment, the rendezvous point is dynamically programmed on how to consolidate the external data. In one embodiment, this programming is communicated to the RP using a CoAP or other protocol message. For example, the RP may be instructed to consolidate the external data using a voting rule (e.g. if more than 60% of the sensed values are equal with a margin of 5%, select that value and report it). The RP can also be programmed to perform more sophisticated processing. For example, the RP may select the two extreme sensed values and report them both as the consolidated result. For example, the RP may determine that one or more values of external data are outside a bound or not in agreement with other external data, and aggregate the coherent external data into the consolidated result, and also reporting an error message to the PCE, a network management system, or the destination application. The RP may eliminate the external data that is incongruous with the other external data, or if all are similar, generate the consolidated result based on an average, or some other statistics to compress over time.

Figure 3A:
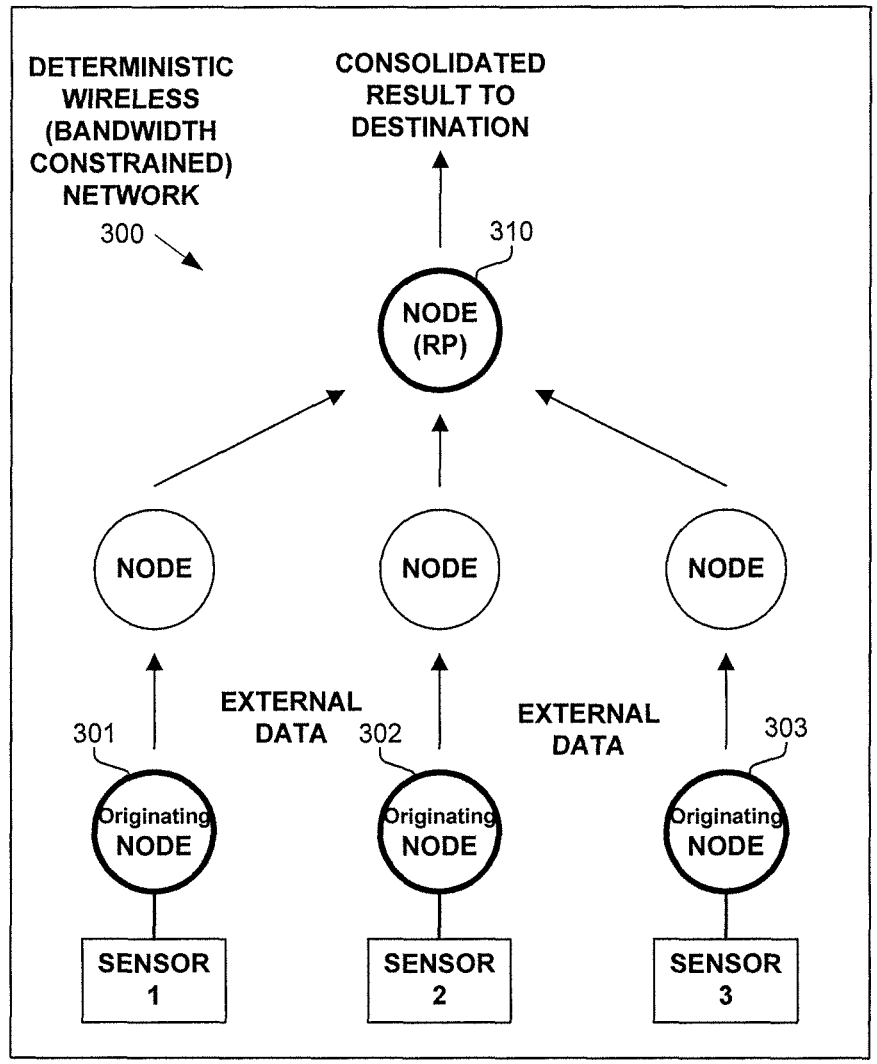
FIG. 3A illustrates a network operating according to one embodiment.

FIG. 3A illustrates a basic configuration of a network 300 using RP 310 to consolidate external data received from originating nodes 301-303 (respectively receiving sensed data related to a same physical event). In one embodiment, these sensors are of a same type (e.g., airspeed sensor, temperature sensor). In one embodiment, these sensors are of a different type but still measure a same physical event (e.g., motion sensor and a microphone for determining if a room is currently occupied or not or for alarm purposes).

In one embodiment, a rendezvous point may signal (e.g., using CoAP or other protocol message) to the RP or network management system that it can no longer perform consolidation, such as, but not limited to, because of lack of local resource (e.g., battery depletion, lack of processing cycles). In one embodiment, such a notification triggers the PCE to reconfigure the network to use a different network node as the RP.

Figure 3B:
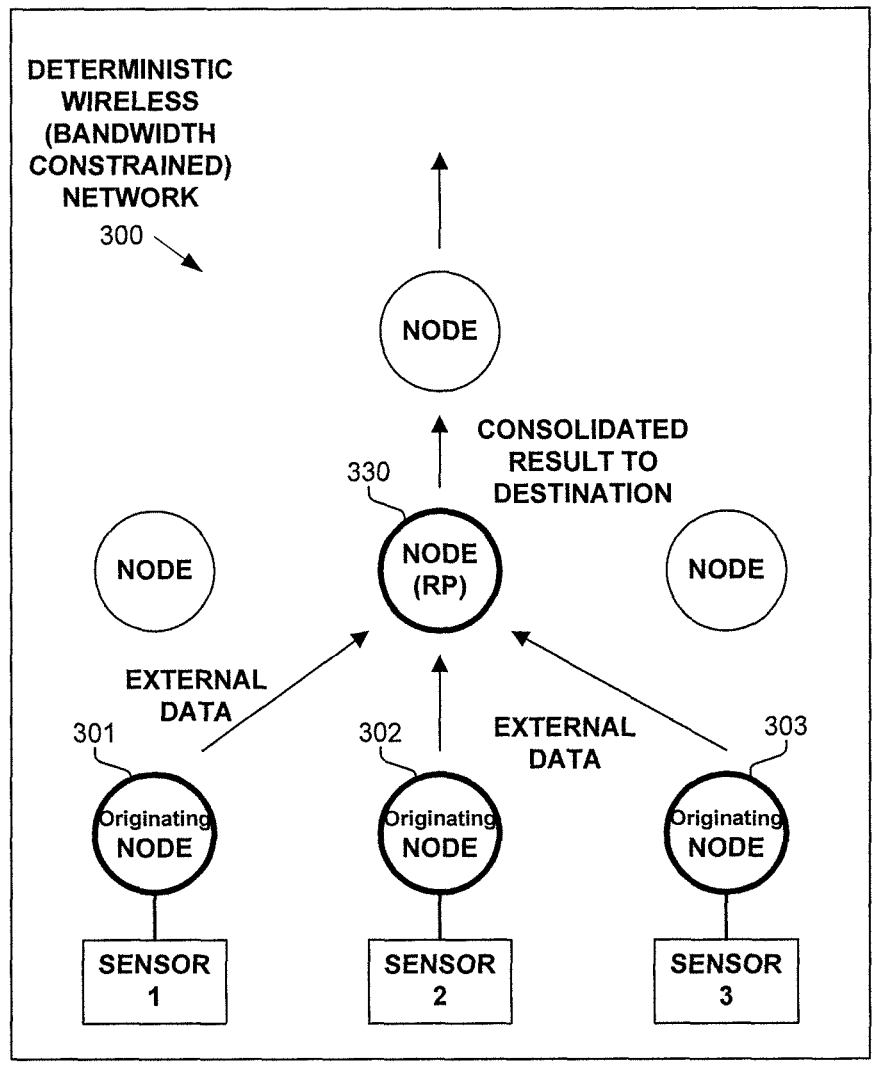
FIG. 3B illustrates a network operating according to one embodiment.

FIG. 3B illustrates network 300 where RP 310 of FIG. 3A is no longer used, but rather new RP 330 is used to consolidate external data received from originating nodes 301-303.

In one embodiment, an RP notifies the RP or network management system so as to dynamically adapt the deterministic paths computation. For example, if the external data (e.g., sensed data) from the multiple sources are all coherent over some period of time, the PCE may decide to recompute the set of paths so as to redirect some sensed data to another rendezvous point.

Figure 3C:
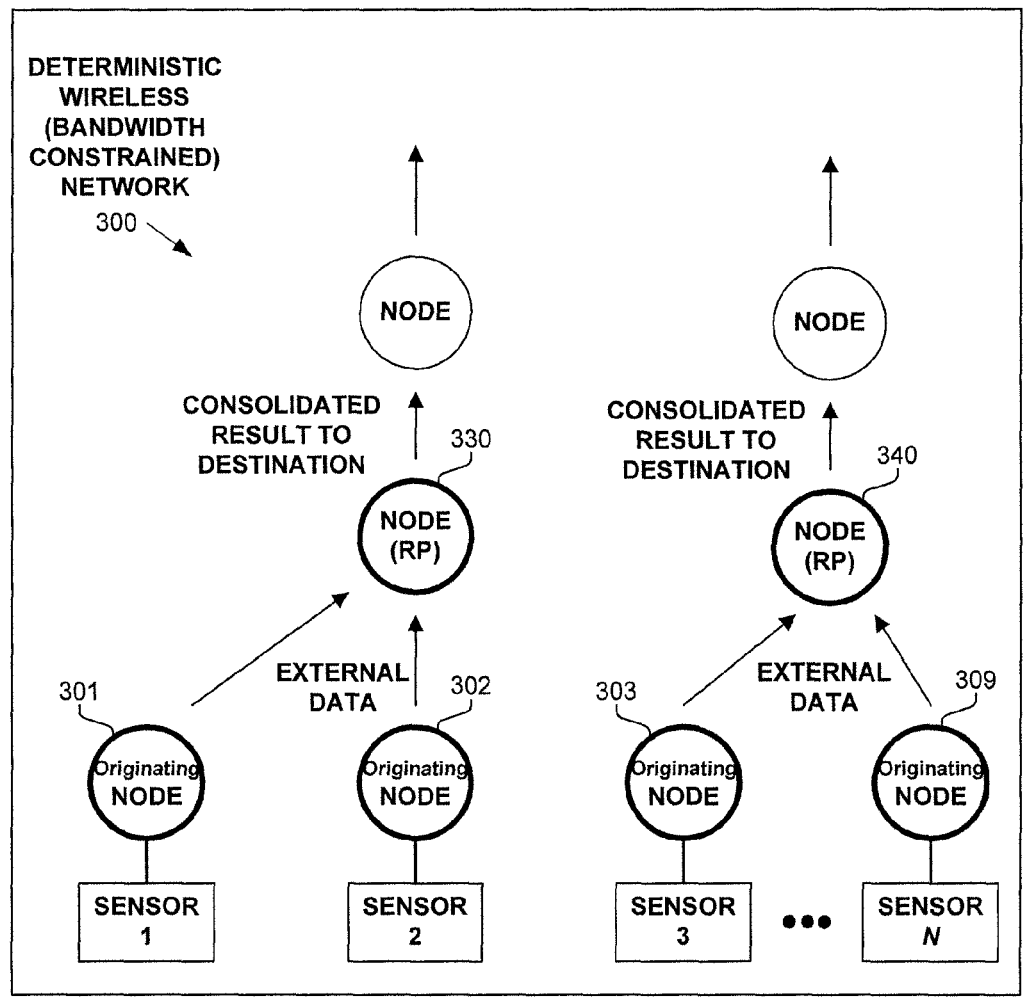
FIG. 3C illustrates a network operating according to one embodiment.

FIG. 3C illustrates network 300 where RP 330 is used to consolidate external data received from originating nodes 301-302 (such as shown in FIG. 3B), while RP 340 is used to consolidate external data received from originating nodes 303-309.

Figure 4A:
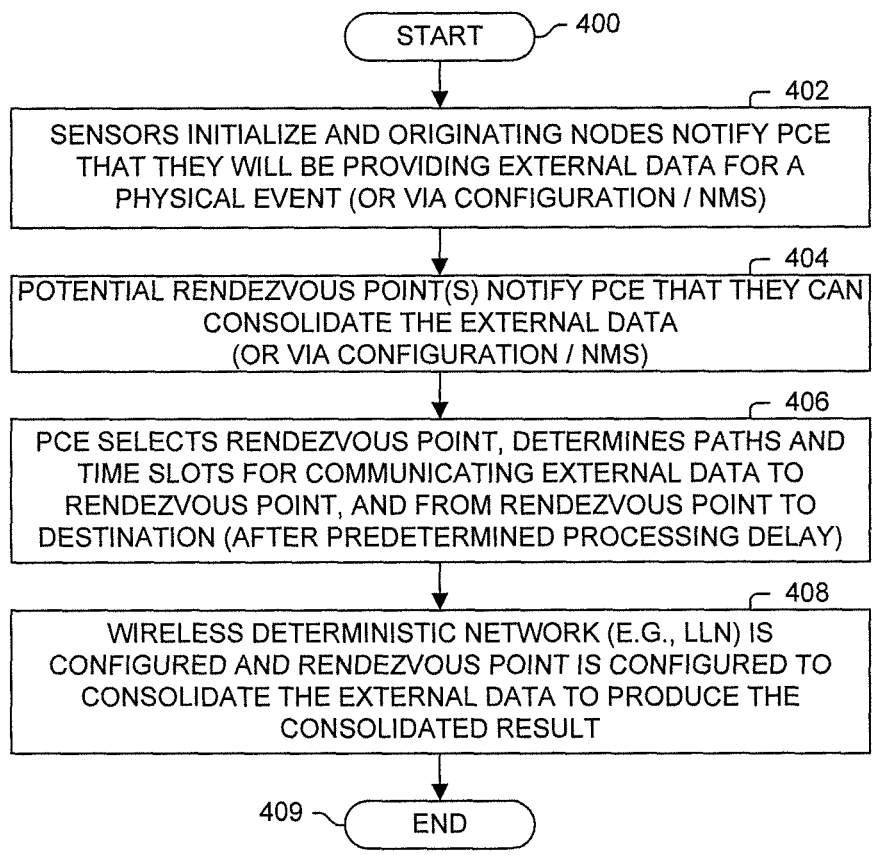
FIG. 4A illustrates a process according to one embodiment.

FIG. 4A illustrates a process performed in one embodiment. Processing begins with process block 400. In process block 402, sensors initialize and originating nodes notify the PCE that they will be providing external data for a physical event. In one embodiment, instead of this advertisement, the PCE receives this information via configuration or an external management system.

In process block 404, potential RPs notify the PCE that they can perform consolidation for the type of external data to be generated by the sensors/originating nodes. In one embodiment, the PCE snoops on advertisement messages from the originating nodes and provides this notification to the PCE in response. In one embodiment, the sensors are external and/or internal to the originating nodes. In one embodiment, instead of this advertisement, the PCE receives this information via configuration or an external management system.

In process block 406, the PCE selects the RP, determines paths (e.g., physical paths and time slots/frequencies) for communicating the external data from each originating node to the RP, allows for an appropriate consolidation time, and then determines a path (e.g., physical path and one or more time slots/frequencies) from the RP to the destination.

In process block 408, the wireless deterministic network (e.g., low power lossy network "LLN") is configured, and the RP is programmed to perform the desired processing to consolidate the external data into a consolidated result.

Processing of the flow diagram of FIG. 4A is complete as indicated by process block 409.

Figure 4B:
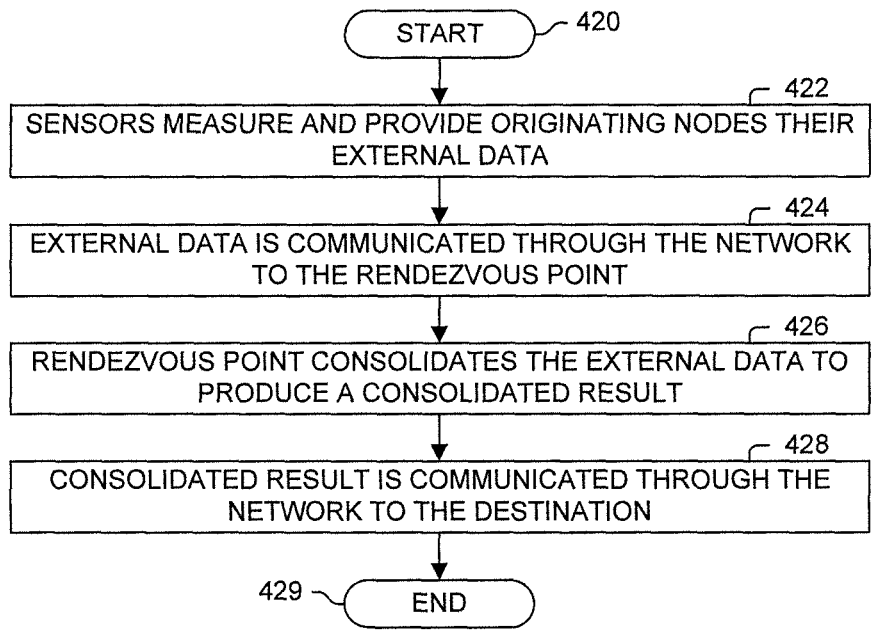
FIG. 4B illustrates a process according to one embodiment.

FIG. 4B illustrates a process performed in one embodiment to sense a physical event and to provide a consolidated result to a destination. Processing begins with process block 420. In process block 422, sensors measure and provide their originating nodes with their external data. In process block 424, each originating node sends their external data through the network to the RP. In process block 426, the RP processes the external data according to its programming (e.g., based on how to manipulate, compute, aggregate or even more sophisticated processing) and generates a consolidated result. In process block 428, the consolidated result is communicated through the network to the destination in one or more time slots (e.g., the consolidated result can be a single packet, or more than one packets). Processing of the flow diagram of FIG. 4B is complete as indicated by process block 429.

Figure 4C:
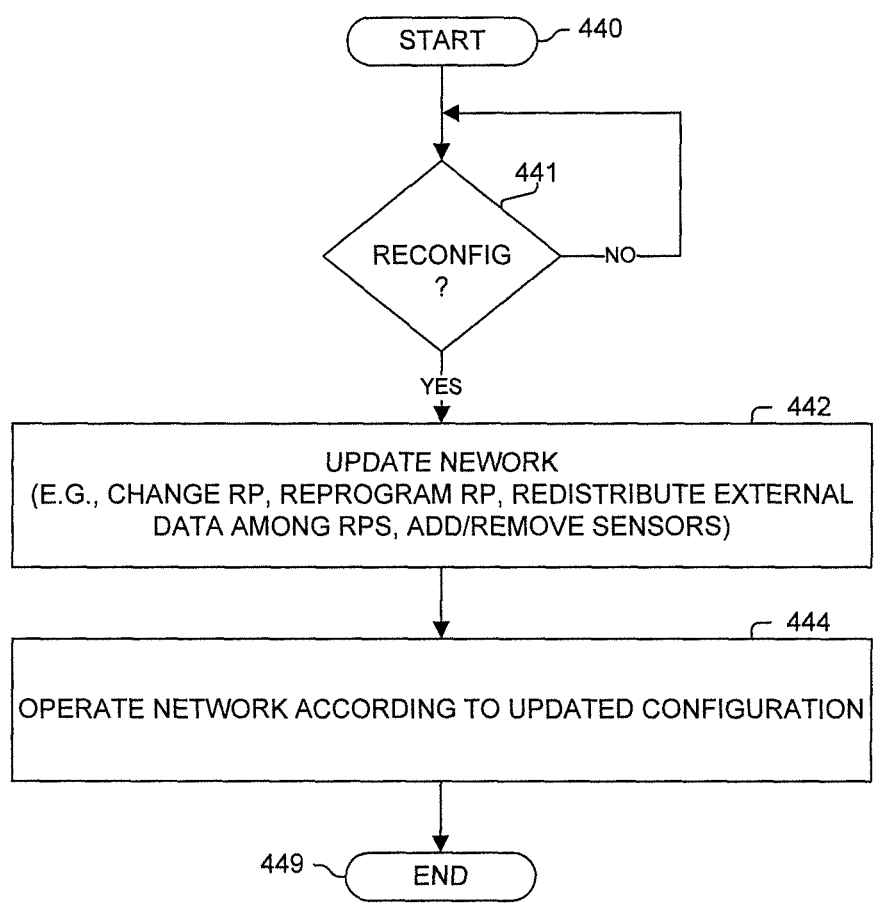
FIG. 4C illustrates a process according to one embodiment.

FIG. 4C illustrates a process performed in one embodiment. Processing begins with process block 440. As determined in process block 441, until it is time to reconfigure the network, processing remains at process block 441. When it is determined to reconfigure the network in process block 441, then in process block 442, the network is updated, such as, but not limited to, changing the RP, reprogramming the RP, redistributing external data among multiple RPs, and/or add or remove external data sources. In process block 444, the network is operated according to its updated configuration. Processing of the flow diagram of FIG. 4C is complete as indicated by process block 449.

Figure 5A:
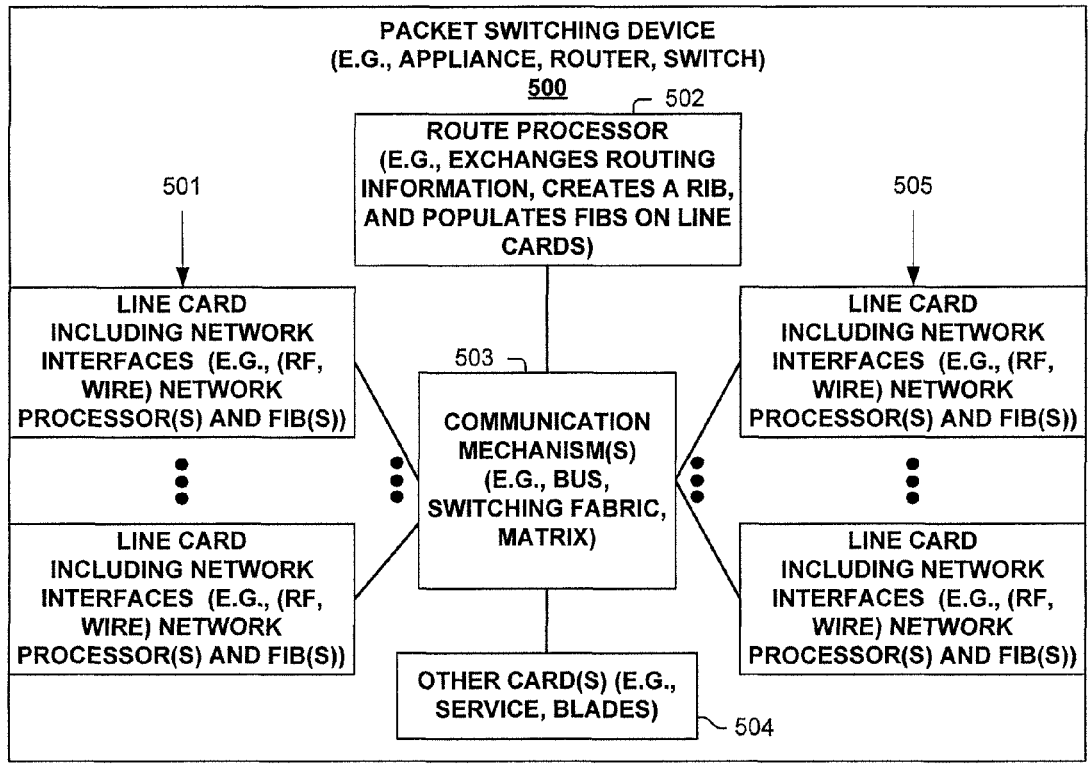
FIG. 5A illustrates a packet switching device according to one embodiment.

One embodiment of a packet switching device 500 (e.g., one example of a network node) is illustrated in FIG. 5A. As shown, packet switching device 500 includes multiple line cards 501 and 505, each with one or more network interfaces for sending and receiving packets over communications links, and with one or more processing elements that are used in one embodiment associated with sensor data transport and consolidation within communication nodes in a network. Packet switching device 500 also has a control plane with one or more processing elements 502 for managing the control plane and/or control plane processing of packets associated with sensor data transport and consolidation within communication nodes in a network. Packet switching device 500 also includes other cards 504 (e.g., service cards, blades) which include processing elements that are used in one embodiment to process packets associated with sensor data transport and consolidation within communication nodes in a network, and some communication mechanism 503 (e.g., bus, switching fabric, matrix) for allowing its different entities 501, 502, 504 and 505 to communicate. In one embodiment, packet switching device 500 has one or more RF interfaces (possibly only one such interface), such as, but not limited to that based on IEEE 802.15.4e.

Figure 5B:
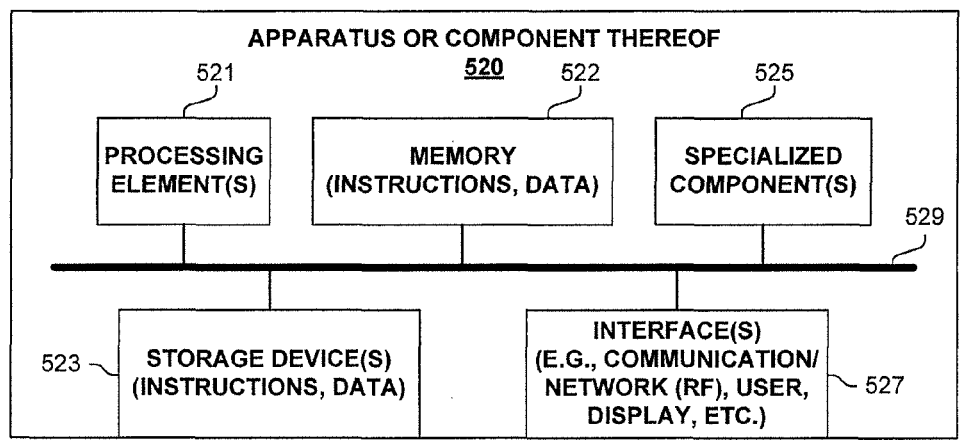
FIG. 5B illustrates an apparatus according to one embodiment.

FIG. 5B is a block diagram of an apparatus 520 (e.g., path computation engine, a node, or portion thereof) used in one embodiment associated with sensor data transport and consolidation within communication nodes in a network. In one embodiment, apparatus 520 performs one or more processes, or portions thereof, corresponding to one of the flow diagrams illustrated or otherwise described herein, and/or illustrated in another diagram or otherwise described herein.

In one embodiment, apparatus 520 includes one or more processing element(s) 521, memory 522, storage device(s) 523, specialized component(s) 525 (e.g. optimized hardware such as for performing lookup and/or packet processing operations, etc.), and interface(s) 527 for communicating information (e.g., sending and receiving packets, user-interfaces, displaying information, etc.), which are typically communicatively coupled via one or more communications mechanisms 529, with the communications paths typically tailored to meet the needs of a particular application. In one embodiment, interface 527 is one or more RF interfaces, such as, but not limited to that based on IEEE 802.15.4e.

Various embodiments of apparatus 520 may include more or fewer elements. The operation of apparatus 520 is typically controlled by processing element(s) 521 using memory 522 and storage device(s) 523 to perform one or more tasks or processes. Memory 522 is one type of computer-readable/computer-storage medium, and typically comprises random access memory (RAM), read only memory (ROM), flash memory, integrated circuits, and/or other memory components. Memory 522 typically stores computer-executable instructions to be executed by processing element(s) 521 and/or data which is manipulated by processing element(s) 521 for implementing functionality in accordance with an embodiment. Storage device(s) 523 are another type of computer-readable medium, and typically comprise solid state storage media, disk drives, diskettes, networked services, tape drives, and other storage devices. Storage device(s) 523 typically store computer-executable instructions to be executed by processing element(s) 521 and/or data which is manipulated by processing element(s) 521 for implementing functionality in accordance with an embodiment.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method comprising:
acquiring, by each of a plurality of originating nodes in a wireless deterministic network, external data related to a same physical event;
communicating through the network said external data from each of the plurality of originating nodes to a rendezvous point network node (RP) within the network;
processing, by the RP, said external data from each of the plurality of originating nodes to produce a consolidated result; and
communicating the consolidated result to a destination node of the network;
wherein said processing said external data includes excluding one or more of said external data received from one or more of the plurality of originating nodes based on an apparent error with said one or more of said external data received from one or more of the plurality of originating nodes.

2. The method of claim 1, wherein the network is a low power lossy network (LLN).

3. The method of claim 1, wherein each of the plurality of originating nodes includes a sensor or receives said external data from a different sensor.

4. The method of claim 1, wherein at least two of the plurality of originating nodes receive said external data from a same sensor.

5. The method of claim 1, comprising: configuring the wireless deterministic network to communicate said external data from the plurality of originating nodes to the RP and the consolidated result from the RP to the destination node.

6. The method of claim 5, wherein said configuring the wireless deterministic network includes determining, by a path computation engine external to the network, paths and time slots for said communicating said external data from the plurality of originating nodes to the RP and said communicating the consolidated result from the RP to the destination node.

7. A method comprising:
configuring a wireless deterministic network to communicate external data from a plurality of originating nodes to a rendezvous point network node (RP) within the wireless deterministic network and a consolidated result from the RP to a destination node, with said configuring the wireless deterministic network includes determining, by a path computation engine external to the wireless deterministic network, paths and time slots for said communicating said external data from the plurality of originating nodes to the RP and said communicating the consolidated result from the RP to the destination node;
acquiring, by each of the plurality of originating nodes in the wireless deterministic network, said external data related to a same physical event;
communicating through the network said external data from each of the plurality of originating nodes to the RP;
processing, by the RP, said external data from each of the plurality of originating nodes to produce a consolidated result;
communicating the consolidated result to the destination node;
wherein the path computation engine provides a delay for performing said processing by the RP between a last time slot for receiving said external data from the plurality of originating nodes and a first time slot for sending the consolidated result to the destination node.

8. A method comprising:
notifying a path computation engine by each particular originating node of a plurality of originating nodes in a wireless deterministic network that said particular originating node will be acquiring data of external data;
in response receiving said notifications determining, by the path computation engine external to the wireless deterministic network, paths and time slots for communicating said external data from the plurality of originating nodes to a rendezvous point network node (RP) and communicating a consolidated result from the RP to a destination node;
configuring the wireless deterministic network to communicate said external data from the plurality of originating nodes to the RP and the consolidated result from the RP to the destination node;

acquiring, by each of the plurality of originating nodes in the wireless deterministic network, said external data related to a same physical event;

communicating through the network said external data from each of the plurality of originating nodes to the RP;

processing, by the RP, said external data from each of the plurality of originating nodes to produce a consolidated result;

communicating the consolidated result to the destination node.

9. A method comprising:

configuring a wireless deterministic network to communicate external data from a plurality of originating nodes to a rendezvous point network node (RP) within the wireless deterministic network and a consolidated result from the RP to a destination node, with said configuring the wireless deterministic network includes determining, by a path computation engine external to the wireless deterministic network, paths and time slots for said communicating said external data from the plurality of originating nodes to the RP and said communicating the consolidated result from the RP to the destination node;

acquiring, by each of the plurality of originating nodes in the wireless deterministic network, said external data related to a same physical event;

communicating through the network said external data from each of the plurality of originating nodes to the RP;

processing, by the RP, said external data from each of the plurality of originating nodes to produce a consolidated result;

communicating the consolidated result to the destination node; and configuring the wireless deterministic network to communicate said external data from the plurality of originating nodes to a second RP and to communicate a second consolidated result determined by the second RP based on said external data to the destination node.

10. The method of claim 9, comprising receiving, by the path computation engine, a notification to use a new RP, with the notification being originated by the RP; and wherein said configuration operation to use the second RP is performed in response to said receipt of the notification.

11. The method of claim 10, wherein the RP generates the notification in response to identifying a node too busy or low on power condition.

12. A method comprising:

configuring a wireless deterministic network to communicate external data from a plurality of originating nodes to a rendezvous point network node (RP) within the wireless deterministic network and a consolidated result from the RP to a destination node;

acquiring, by each of the plurality of originating nodes in the wireless deterministic network, said external data related to a same physical event;

communicating through the network said external data from each of the plurality of originating nodes to the RP;

processing, by the RP, said external data from each of the plurality of originating nodes to produce a consolidated result;

communicating the consolidated result to the destination node; and in response to determining that the RP no longer needs said external data from at least one of the plurality of originating nodes to produce the consolidated result, configuring the wireless deterministic network to communicate said external data from said at least one of the plurality of originating nodes to a second RP to use in producing a second consolidated result while the RP continues to process said external data received from the other of the plurality of originating nodes to produce the consolidated result.

13. The method of claim 1, wherein the consolidated result is a single result.

14. A method comprising:

acquiring, by each of a plurality of originating nodes in a wireless deterministic network, external data related to a same physical event;

communicating through the network said external data from each of the plurality of originating nodes to a rendezvous point network node (RP) within the network;

processing, by the RP, said external data from each of the plurality of originating nodes to produce a consolidated result; and communicating the consolidated result to a destination node of the network;

wherein said processing said external data includes taking an average of at least two of said external data.

15. The method of claim 1, wherein the RP is on a shortest path between two of the originating nodes and the RP.

16. A method, comprising:

receiving, by a rendezvous point network node (RP) in a wireless deterministic network, a plurality of packets including external data acquired by a plurality of different originating nodes in the network, with said external data including an instrumented result of a same physical event;

processing, by the RP, said received external data from each of the plurality of different originating nodes to generate a consolidated result; and sending the consolidated result to a destination in the network;

wherein the RP said sends the consolidated result out on a time slot after a predefined delay for performing said processing after a last time slot on which one of said external data could be said received by the RP.

17. A method comprising:

receiving, by a path computation engine, a notification from each of a plurality of originating nodes in a wireless deterministic network that they will be generating external data related to a same physical event;

selecting, by the path computation engine, a rendezvous point network node (RP) to use to consolidate said external data received from the plurality of originating nodes based on a received consolidation-capable advertisement from the RP; and determining, by the path computation engine, paths and time slots for communicating said external data from the plurality of originating nodes in a wireless deterministic network to the RP, and from the RP to a destination node in the network.

* * * * *